United States Patent [19]

Hüther et al.

[11] Patent Number: 4,511,612

[45] Date of Patent: Apr. 16, 1985

[54] MULTIPLE-LAYER WALL FOR A HOLLOW BODY AND METHOD FOR MANUFACTURING SAME

[75] Inventors: Werner Hüther; Axel Rossmann, both of Karlsfeld, Fed. Rep. of Germany

[73] Assignee: Motoren-und Turbinen-Union Munchen GmbH, Munich, Fed. Rep. of Germany

[21] Appl. No.: 410,059

[22] Filed: Aug. 20, 1982

[30] Foreign Application Priority Data

Aug. 21, 1981 [DE] Fed. Rep. of Germany ....... 3133209

[51] Int. Cl.[3] ............................................ F16M 1/00

[52] U.S. Cl. ...................................... 428/36; 123/270; 123/285; 264/60; 428/367; 428/450; 428/469; 428/697; 428/698; 428/701

[58] Field of Search ............... 428/426, 489, 498, 428, 428/698, 701, 312.6, 312.8, 313.9, 314.2, 367, 450, 469, 697, 36; 501/95, 88, 98; 123/270, 271, 272, 193 R, 668, 669, 285; 264/60, 61

[56] References Cited

U.S. PATENT DOCUMENTS

| | | | |
|---|---|---|---|
| 3,931,438 | 1/1976 | Beall et al. | 156/84 |
| 3,960,995 | 6/1976 | Kourkene | 264/61 |
| 4,324,843 | 4/1982 | Brennan et al. | 428/698 |
| 4,325,334 | 4/1982 | Nishida et al. | 123/270 |
| 4,341,826 | 7/1982 | Prewo et al. | 428/698 |
| 4,346,556 | 8/1982 | Rice et al. | 428/36 |
| 4,363,832 | 12/1982 | Odawara | 264/60 |

OTHER PUBLICATIONS

D. J. Godfrey, "The Use of Ceramics in High Temperature Engineering", *Metals and Materials,* 2(10), 305–311, (1968).

D. J. Godfrey, "Ceramics for High Performance Application"–II, Chapter 45, The Performance of Ceramics in the Diesel Engine, 1978, pp. 887–892.

*Primary Examiner*—Marion E. McCamish
*Assistant Examiner*—William M. Atkinson
*Attorney, Agent, or Firm*—Posnack, Roberts, Cohen & Spiecens

[57] ABSTRACT

A multiple-layer wall is provided for a hollow body to sustain high thermal and mechanical loads and to afford adequate thermal insulation. The wall has, on the inside, a heat and/or wear resistant ceramic inner layer and, surrounding it, a preferably prestressed retaining layer of fiber reinforced plastic. An intermediate layer of a thermally insulating ceramic material can also be provided. The wall can also have a retaining layer of metal. At least the retaining layer is shrink-fitted. The retaining layer of metal and/or the intermediate layer moreover can be deposited by a sintering process. Prestressing is achieved also by the shrinkage resulting from the sintering process. As a result of prestressing, the inner layer, when under internal pressure, comes under substantially no circumferential tension or under circumferential compression only. The wall is used especially with precombustion chambers of Diesel engines or with cylinder barrels or internal combustion engines.

15 Claims, 1 Drawing Figure

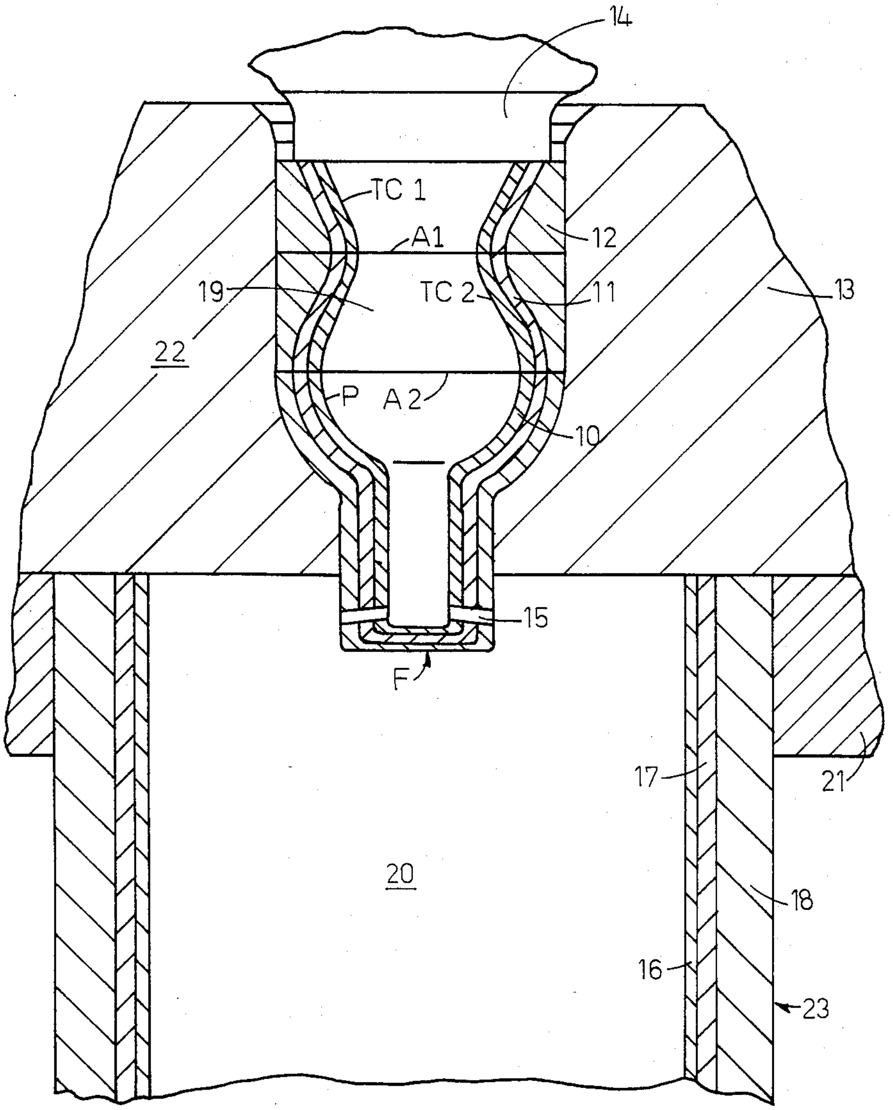
14
TC 1
12
A1
19
TC 2
11
13
22
P
A 2
10
15
F
17
21
20
18
16
23

MULTIPLE-LAYER WALL FOR A HOLLOW BODY AND METHOD FOR MANUFACTURING SAME

FIELD OF THE INVENTION

The invention relates to multiple-layer walls for use, for example, with Diesel engines, cylinder barrels, and internal combustion engines. The invention also relates to methods for manufacturing such multiple-layer walls.

SUMMARY OF THE INVENTION

It is an object of the present invention to provide an improved multiple-layer wall which is especially tolerant of high thermal and mechanical loads and which, if desired, can provide a high degree of thermal insulation.

To achieve the above and other of the objects of the invention, there is provided a hollow body comprising a multiple-layer wall having a load side. The wall includes a ceramic inner layer bounding the load side and an outer retaining layer of fiber-reinforced material or metal confining the aforementioned layer and further comprising an intermediate layer of thermally insulating ceramic material between said inner and retaining layers, said intermediate layer being shrinkfitted or sintered on to the inner layer.

In accordance with a further feature of the invention, the retaining layer compressibly pre-stresses the aforesaid inner layer.

In accordance with some more specific aspects of the invention, the aforementioned ceramic layer may be, for example, of silicon carbide or silicon nitride. The aforesaid metal may be of a highly heat-resistant steel. The fiber-reinforced material may be a carbon fiber-reinforced graphite. The afore-mentioned thermally insulating ceramic material may be of lithium aluminum silicate, magnesium aluminum silicate, aluminum titanate, or pyrolitic boron nitride.

According to still further aspects of the invention, the above-mentioned wall constitutes a precombustion chamber for a Diesel engine. Alternatively, the wall may constitute a cylinder barrel for an internal combustion engine. Furthermore, the wall may preferably be split into multiple sections along parallel planes or the like. Additionally, it may include inversed truncated conical sections and a pelvis-shaped section in abutting serial relationship.

According to yet another aspect of the invention, there is provided a method for manufacturing the aforesaid multiple-layer wall wherein the retaining layer is shrink-fitted on the other layer or layers. Additionally, the insulating ceramic intermediate layer may be prepared by depositing a layer of sinterable insulating ceramic powder on the inner layer and sintering the same. The retaining layer, if of metal, may be manufactured by depositing a layer of sinterable metal powder and sintering the same. At least one of the powder layers may be deposited by isotatic pressing or by transfer molding. The insulating ceramic intermediate layer and the retaining layer of metal may be prepared by pouring.

The above and other features, objects and advantages of the invention will be found in the detailed description which follows hereinafter as illustrated in the accompanying drawing.

BRIEF DESCRIPTION OF THE DRAWING

In the drawing:

The sole FIGURE is a fragmentary cross-sectional view of a Diesel engine including two multiple layer walls each of which is provided in accordance with the invention.

DETAILED DESCRIPTION

In accordance with the invention, there is utilized a ceramic inner layer of a ceramic material designed to safely sustain high temperatures and/or severe wear or friction. A retaining layer of, for example, fiber-reinforced material is designed to give the wall great strength properties other than wear-resistance, especially high tensile strength, preferably for absorbing the pressure of a fluid contained in the interior of the associated hollow body.

Tensile forces are involved (with a hollow body of revolution they act in a circumferential direction) and are, according to one embodiment, absorbed by reinforcement fibers of the aforementioned retaining layer which, as a result of said tensile forces, comes under tensile stresses directed in the longitudinal direction of the fibers. Such reinforcement fibers, more particularly, are circumferential fibers, i.e. circumferentially wound or extending reinforcement fibers. Use can also be made in accordance with the invention, of diagonally extending, intersecting reinforcement fibers.

Moreover, the ceramic inner layer can be compressively pre-stressed by the aforesaid retaining layer (the compressive forces involved act in a circumferential direction with the hollow body of revolution) such that the internal pressures which can be sustained are substantially higher than with a hollow body the wall of which is made of a ceramic material only. The ceramic inner layer accordingly when under internal pressure, is not so much exposed to tensile loads, which it may have trouble surviving. The compressive prestress can be selected such that the ceramic inner layer, when under moderate internal pressures, comes under compressive load, which it will bear more readily than tensile load.

The retaining layer can also be given a high modulus of elasticity, extremely little thermal expansion, and relatively high thermal resistance. If it is intended to give the wall thermally insulating properties, the insulating ceramic intermediate layer is provided between the two other layers. The intermediate layer operates to reduce thermal conductance to the outside and so retains the heat internally, preventing the retaining layer from overheating and losing strength. It is because of this intermediate layer that the wall when under thermal load can be held at a temperature which the material of the retaining layer will safely sustain at not more than modest cooling effort.

The intermediate layer, however, can be omitted if its presence is not desired or necessary, e.g. when the temperature in the interior is relatively low. The retaining layer normally is the outermost layer of the wall of the hollow body. The two or three layers normally abut one against the other. In some cases, however, one or more additional layers and/or intermediate layers of a suitable material or materials can be provided.

According to another embodiment, the retaining layer is of metal rather than of a fiber-reinforced material. In this case, the metallic retaining layer or its metal is selected such that the layer or metal gives the wall great strength properties other than wear resistance, especially great tensile strength, and such that the aforesaid tensile forces are absorbed by the metallic intermediate layer and the ceramic inner layer is given said compressive prestress by means of the metallic retaining layer. Also, if the retaining layer is metal, the strength, i.e. the tensile strength, the modulus of elasticity and the temperature resistance are often lower, and the thermal expansion is often more pronounced than with fiber-reinforced materials, which equally applies to highly heat-resistant steel as a preferred metal for the retaining layer. The insulating ceramic intermediate layer is provided especially because of the lower resistance to temperature and more pronounced thermal expansion. The ceramic materials of the ceramic inner layer exhibit a high degree of temperature resistance and high resistance to wear or abrasion and carbon fiber reinforced graphite, when used for the retaining layer, exhibits great tensile strength. Materials which can be used for the intermediate layer include lithium aluminum silicate (LAS), magnesium aluminum silicate (MAS), aluminum titanate ($AlTiO_3$) or pyrolitic boron nitride (BN). These materials afford good thermal insulation. The fiber reinforced material (embedding material or matrix) of the retaining layer, more particularly, is preferably an organic material or metal.

The ceramic inner layer can be given said compressive pre-stress more particularly by the provisions next described. The three layers, are, for example, manufactured in the shape of solid hollow bodies and the hollow intermediate layer body is shrink-fitted on the hollow inner layer body, and the hollow retaining layer body is shrink-fitted on the intermediate layer body. This process is suitable for the manufacture of a tube. The method is relatively simple to implement.

Another procedure can be used especially with a complex-shape, molded hollow body, but also with a tube. Deposition of a sinterable insulating ceramic powder layer or layers is especially effected by depositing the powder layer by isotatic pressing or transfer molding. Deposition of a sinterable metal powder, especially of, for example, highly heat-resistant steel, upon sintering automatically prestresses the ceramic layer compressively, considering that, in the cooling process after sintering, the metal will shrink more than the ceramic inner layer or the ceramic inner member.

The invention finds use especially with the precombustion chambers of Diesel engines, with cyliner barrels of internal-combustion engines, with a hot gas wetted casing or casing members, with antifriction bearing rings, and with plain bearings (e.g., with the bearing liners thereof), these parts forming said hollow body. These means or parts come under considerable thermal and mechanical loads (especially due to internal pressure and/or friction). Also, they normally require adequate thermal insulation, especially the precombustion chambers and the cylinder barrels to keep engine losses low.

The drawing illustrates two multiple-layer walls of the present invention as used in a precombustion chamber and a cylinder barrel of a Diesel engine, which is shown in longitudinal section.

In the illustrated construction, a precombustion chamber 22 and a cylinder barrel 23 are provided in the form of hollow, rotationally symmetrical bodies. The precombustion chamber 22 is arranged in the bore of a cylinder head 13 made of steel. The chamber, or its wall, consists of a heat resistant, ceramic inner layer 10 of silicon carbide (SiC) or silicon nitride ($Si_3N_4$), of a thermally insulating ceramic layer 11 of magnesium aluminum silicate (MAS) and of a retaining layer 12 of carbon fiber reinforced graphite. Layer 11 can also be formed of lithium aluminum silicate (LAS), aluminum titanate ($AlTiO_3$) or pyrolytic boron nitride (BN). When viewed in the direction of the cylinder barrel 23 the ceramic inner layer 10 extends such that the interior of the precombustion chamber 22 first narrows in truncated conical fashion as indicated at TC1, then widens in truncated conical fashion to form a belly-shaped combustion space 19, then widens in truncated conical fashion as indicated at TC2 and again narrows in pelvis fashion, after which it continues cylindrically. The retaining layer 12, or the precombustion chamber 22, takes an externally cylindrical shape alongside the two truncated conical sections, and then likewise narrows in pelvis fashion as indicated at P to continue cylindrically. The cylinder head bore has the same shape and the same dimensions.

For seating the retaining layer 12, the precombustion chamber 22 is composed of three axially successive members, with the parallel separating planes A1 and A2 extending where the two truncated conical sections meet and at the major pelvis diameter. The ceramic inner layer 10 is made as a solid part. The insulating ceramic intermediate layer 11 is made by depositing a layer of sinterable insulating ceramic powder of magnesium aluminum silicate (MAS) on the ceramic inner body 10 in a mold and by isostatic pressing or transfer molding (injection molding) and by sintering this layer of powder. The retaining layer 12 is manufactured as a solid part and is then shrink-fitted on the insulating ceramic intermediate layer 11.

An insert piece 14 urges the three precombustion chamber parts in the cylinder head bore one against the other and against the pelvis of the cylinder head 13 by means of axially extending parallel bolts (not shown) which connect the insert piece 14 to the cylinder head 13. The exhaust cylinder of the precombustion chamber 22 projects slightly into the combustion space 20 of the engine cylinder, where it has circumferentially equally spaced, approximately radial exit ducts 15 and terminates with its three layers 10 to 12 in threelayer closing face F.

The cylinder barrel 23 is a hollow cylindrical body and is fitted in an engine block 21 to which is bolted the cylinder head 13. The cylinder barrel 23 or its wall consists of a heat and wear or abrasion resistant ceramic inner layer 16 of silicon carbide (SiC), an insulating ceramic layer 17 of aluminum titanate ($AlTiO_3$) and a retaining layer 18 of highly heat-resistant steel. The layers 16 and 17 are manufactured separately as solid parts, and the part 17 is shrink-fitted on part 16. The retaining layer 18 is then manufactured by depositing a sinterable powder of highly heat-resistant steel in a mold on the part 17 and by isostatic pressing or transfer molding (injection molding) and by a sintering of said layer of powder.

Preferred examples of manufacturing the cylinder barrel as shown in the following drawing hereafter (a) manufacturing a ceramic tube by pressureless sintering of SiC powder
 length of tube—100 mm
 inner diameter—70 mm
 outer diameter—80 mm (b) preparing of a sinterable glass-powder for MAS as disclosed in "Properties of Cordierit Glass-Ceramics Produced by Sintering and Crystallization of Glass Powder" by Claes I. Helgesson in Science of Ceramics Vol. 8 1976 pages 347–361 published by the British Ceramic Society.

(c) The glass powder is applied onto the tube by cold isostatic pressing and it is than thermally treated as disclosed in the paper mentioned above to transform it to MAS. Thereafter the MAS-layer is machined so that the SiC tube has an outer layer of MAS with a thickness of about 5 mm.

(d) ($\alpha$) The tube is then covered with a 5 mm layer of circumferentially wound carbon fibers, impregnated with resin which is carbonized thereafter as described later (d) ($\beta$) instead of applying a fiber-reinforced material as described above an outer retaining layer of metal can be prepared as follows:

There is manufactured an outer tube of Nimonic 90 (length 100 mm, inner diameter 90.4 mm$\pm$50 $\mu$m, outer diameter 100 mm). This outer tube is heated to 600° C. and shrink-fitted on the SiC tube with MAS layer.

Preferred examples for manufacturing the precombustion chamber for the Diesel engine as illustrated in the drawing follow hereafter (1)

(a) firstly the heat resistant inner wall is made by pressureless sintering of $Si_3N_4$ (b) an MAS layer is applied onto the ceramic body under conditions as described previously for the "cylinder barrel"

(c) a layer of Udimet 700 powder, grain size less than 45 $\mu$m, is applied onto the composite part by cold isostatic pressing (pressure 2000 bar)

(d) the resulting green compact is machined so that a green wall thickness of 6 mm is achieved (e) the whole workpiece is sintered by heating it to a temperature of 1200° C. under inert gas for 4 hours; heating-up-speed: 5° C./min.

(2)

(a) a heat resistant inner wall is made by the pressureless sintering of $\alpha$-SiC (b) a pyrolitic boron nitride layer of a thickness of 20 $\mu$m is applied to the inner wall;

(c) the composite part is placed into a mold the size of which is such that a gap of 10 mm is formed between the mold and the outer surface of composite part and an Al-alloy is poured into the gap. (e.g. G-Al Si 5 Mg Wa).

Details of the materials and shrink-fitting process are given hereafter:

(1) The materials and process will be described for the manufacture of a product comprising three tubes, namely the inner tube, the intermediate tube and the outer tube. The inner tube is made from SiC or $Si_3N_4$ ceramics, the intermediate tube is made from lithium aluminum silicate, magnesium aluminum silicate, aluminum titanate, or pyrolitic boron nitride and the outer tube is made from carbon fiber reinforced graphite or from special steel such as $\times$10 CrNiTi 1810, or Inconel 718 C. 263, Inconel 100, Udimet 700 powder with a grain size below 45 $\mu$m or a metal powder consisting of 3% Al, 11% Co, 15% Cr, 3% Ti and the remainder to 100% of Ni; (% by weight) with a specific surface of 1–2 $m^2/g$ (2) in a first step the inner tube is shrink fitted in the intermediate tube and thereafter the resulting composite tube consisting of the inner and intermediate tubes is shrink-fitted in the outer tube.

Hereafter will be described in greater detail specific fiber reinforced materials:

(1) Preferably there is used carbon fiber reinforced graphite (CFC) comprising 55% carbon fiber (high modulus type PAN or pitch respectively) and graphite. The fibers are wound to form a tube and are impregnated with a resin which under carbonization forms a high portion of residues. Such resins are, for example,: Phenol, Polyamide, Polyphenylene. The resin is carbonized under inert gas (i.e. in the absence of oxygen) and at a temperature of up to 1000° C. Impregnating and carbonizing are repeated between two and five times. Thereafter graphitization is performed by heating up to 2000° C., under inert gas for a duration of 10 hours.

(2) There can be used boron carbide coated boron fibers in a matrix of aluminum (aluminum 6061 F. or 2024 F.). Preferably, fibers are used with a diameter of 8 mils and an average tensile strength of 530 KSI. The treatment takes place at a bonding temperature of 560° C. and at a bonding pressure of 15 bar.

What is claimed is:

1. A casing subjected to hot gases such as combustion gases of an engine and comprising a hollow body including a three-layer composite wall having a load side, said wall including a ceramic inner layer bounding said load side and an outer retaining layer of fiber-reinforced material or metal confining said inner layer, and further comprising an intermediate layer of thermally insulating ceramic material between said inner and retaining layers, said intermediate layer being shrinkfitted or sintered on to the inner layer, said retaining layer compressively prestressing said inner layer.

2. A casing as claimed in claim 1 wherein said ceramic inner layer is of silicon carbide or silicon nitride.

3. A casing as claimed in claim 1 or 2 wherein said retaining layer is a carbon fiber reinforced graphite.

4. A casing as claimed in claim 1 wherein said retaining layer is of highly heat-resistant steel.

5. A casing as claimed in claim 1 or 4 wherein said thermally insulating ceramic intermediate layer is lithium aluminum silicate, magnesium aluminum silicate, aluminum titanate or pyrolitic boron nitride.

6. A method for manufacturing a multiple-layer wall as claimed in claim 5 wherein the insulating ceramic intermediate layer is prepared by depositing a layer of sinterable insulating ceramic powder on the inner layer by isostatic pressing or by transfer molding and sintering the same.

7. A method as claimed in claim 6 wherein said outer retaining layer of metal is prepared by pouring the metal around the composite structure consisting of said inner and intermediate layers in a mold.

8. A method as claimed in claim 6 wherein said outer retaining layer of metal is prepared by depositing a layer of sinterable metal powder on the composite structure consisting of said inner and intermediate layers and sintering said powder.

9. A casing as claimed in claim 1 wherein said wall constitutes a pre-combustion chamber for a Diesel engine.

10. A casing as claimed in claim 9 wherein said multiple sections include inverse conical sections and a pelvis shaped section in abutting serial relationship.

11. A casing as claimed in claim 1 wherein said wall constitutes a cylinder barrel for an internal combustion engine.

12. A casing as claimed in claim 1 wherein said wall is divided into multiple sections along parallel planes.

13. A method for manufacturing a multiple-layer wall as claimed in claim 1 wherein said retaining layer is shrink-fitted on the assembly consisting of said inner and intermediate layers.

14. A casing as claimed in claim 1 wherein said ceramic inner layer has heat corrosion resistance at elevated temperatures and said intermediate ceramic layer is heat insulative to prevent heat loss.

15. A casing as claimed in claim 14 wherein said ceramic inner layer has low tensile strength and high compressive strength whereby the prestress of the retaining layer enables said ceramic inner layer to resist high internal pressures in said casing.

* * * * *